United States Patent
Rigby et al.

(10) Patent No.: US 7,280,472 B2
(45) Date of Patent: Oct. 9, 2007

(54) PROTECTION SWITCHING AT A NETWORK NODE

(75) Inventors: John Rigby, Reading (GB); Shiva Shenoy, San Jose, CA (US); Prashanth Ishwar, Santa Clara, CA (US); Apurva Mehta, Cupertino, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 1059 days.

(21) Appl. No.: 10/340,083

(22) Filed: Jan. 10, 2003

(65) Prior Publication Data

US 2003/0223358 A1 Dec. 4, 2003

Related U.S. Application Data

(60) Provisional application No. 60/386,076, filed on Jun. 4, 2002.

(51) Int. Cl.
- *G01R 31/08* (2006.01)
- *G08C 15/00* (2006.01)
- *H04J 1/16* (2006.01)
- *H04J 3/14* (2006.01)
- *H04L 1/00* (2006.01)

(52) U.S. Cl. .................. 370/230.1; 370/217; 370/218; 370/219; 370/223; 370/227; 370/352; 370/353; 370/354; 370/355; 370/356; 370/229; 370/230; 370/231; 370/232

(58) Field of Classification Search ............ None
See application file for complete search history.

(56) References Cited

U.S. PATENT DOCUMENTS

| | | | |
|---|---|---|---|
| 5,848,227 A | | 12/1998 | Sheu |
| 6,463,062 B1 * | | 10/2002 | Buyukkoc et al. ....... 370/395.1 |
| 6,530,032 B1 * | | 3/2003 | Shew et al. ............... 714/4 |
| 6,738,352 B1 * | | 5/2004 | Yamada et al. ........... 370/238 |
| 2001/0037401 A1 * | | 11/2001 | Soumiya et al. ........... 709/232 |
| 2002/0181395 A1 * | | 12/2002 | Foster et al. ............. 370/229 |

OTHER PUBLICATIONS

Forwarding and Control Element Protocol, Internet Engineering Task Force, Feb. 2002.

* cited by examiner

*Primary Examiner*—Raj K. Jain

(57) ABSTRACT

Protection switching between primary and secondary paths in a packet-based network involves table entries that are pre-programmed with a primary path, a secondary path, and a value that identifies the primary path, referred to as a primary path identifier (PPI). When table entries are accessed to make forwarding decisions, the PPI is compared to a field that identifies that a particular path is down, referred to as a down path identifier (DPI). If the two fields match, (i.e., PPI=DPI), then the secondary path is selected instead of the primary path as the path on which the traffic should be forwarded.

25 Claims, 8 Drawing Sheets

Forwarding Element for Packet from A to C

DPI=0

Forwarding Element for Packet from A to D

DPI=0

| Down Path Resisters | t=1 | 2 | time 3 | 4 |
|---|---|---|---|---|
| $DPI_1$ | 0 | 35 | 35 | 0 |
| $DPI_2$ | 0 | 76 | 76 | 76 |
| $DPI_3$ | 0 | 0 | 0 | 46 |
| $DPI_4$ | 0 | 0 | 0 | 0 |
| $DPI_5$ | 0 | 0 | 0 | 0 |

PROTECTION SWITCHING AT A NETWORK NODE

CROSS-REFERENCE TO RELATED APPLICATION

This application is entitled to the benefit of provisional U.S. Patent Application Ser. No. 60/386,076, filed Jun. 4, 2002.

FIELD OF THE INVENTION

The invention relates to protection switching, and more particularly to protection switching between primary and secondary paths at a network node.

BACKGROUND OF THE INVENTION

In packet-switched networks, packets traveling from a source node to a destination node may be transmitted through many intermediate network nodes, such as switches or routers. Intermediate network nodes that receive packets headed for a destination node utilize lookup tables to determine the next path for the packets. The lookup tables include forwarding information that indicates the path on which the packets should be forwarded. For example, a routing table will include forwarding information that relates many different destination Internet protocol (IP) addresses or IP address prefixes to next hop identifiers. It is not uncommon for a forwarding table to have in excess of 100,000 different stored table entries.

In a mesh network architecture, it is likely that there is more than one path that a packet can take to reach its destination. FIG. 1 depicts an example of a mesh network architecture in which there is more than one path that can be used to get packets from a source node to a destination node. For example, packets from source node A 10 can reach destination node C 12 via routers $R_1$ 16 and $R_2$ 18 and paths 40:60 or via routers $R_1$ and $R_3$ 20 and paths 50:90. Likewise, packets from source node A can reach destination node D 14 via routers $R_1$ and $R_3$ and paths 50:70 or via routers $R_1$ and $R_2$ and paths 40:80.

While there may be different possible paths that packets can travel to get from a source node to a destination node in a network, the forwarding information identified during the lookup process only indicates one of the paths. For example, at router $R_1$ 16 a lookup for a packet destined for node C 12 will yield forwarding information that identifies only one path (i.e., path 40:60) and a lookup for a packet destined for node D 14 will yield forwarding information that identifies only one path (i.e., path 50:90).

Packet-switched networks are currently being adapted to support traditional telecommunications traffic, such as voice communications. In order for packet-switched networks to support traditional telecommunications traffic, the packet-switched networks must include failure protection mechanisms that ensure a standard of reliability that meets or exceeds the reliability standards that are achieved by circuit-switched networks. For example, in order to preserve the quality of a voice conversation, it is important that a network can recover from a path failure within 50 milliseconds (ms).

One failure protection technique that has been used in packet-based mesh networks involves identifying a secondary, or redundant path, that can be used to re-route traffic in the event of a failure of the primary path. Referring to the example network of FIG. 1, primary and secondary paths may be established between the source node A and the destination nodes. For example, the path 40:60 may be established as the primary path between source node A and destination node C with the path 50:90 being established as the secondary path. Likewise, the path 50:70 may be established as the primary path between source node A and destination node D with the path 40:80 being established as the secondary path. In the event of a failure along path 40:60, the traffic destined for node C can be switched to the secondary path (i.e., path 50:90).

In order to initiate path switching at the lookup stage of packet processing, it is necessary to change the forwarding information that is stored in the lookup table to reflect the desired change in path. In prior art systems, changing the forwarding information is a software-based process that requires re-writing the forwarding information in the lookup table. While re-writing a single table entry or a few table entries in an acceptable time period (i.e., <50 ms) is a trivial task, the task is much more difficult in real-world network nodes, such as switches and routers, which may contain in excess of 100,000 different table entries. For example, if 10,000 table entries need to be updated as a result of a path failure and it takes 10 μs to update each entry, then the time required to update all 10,000 table entries will be 100 ms. In the 100 ms that it takes to update all 10,000 table entries, it is possible that some traffic will be forwarded to the failed path, causing traffic to be lost. Lost traffic will likely result in missing the 50 ms acceptable time limit for failure recovery.

In view of the desire to support traditional telecommunications traffic with packet-based networks, what is needed is a protection switching technique that provides fast protection switching and that can scale to efficiently handle large numbers of different table entries.

SUMMARY OF THE INVENTION

Protection switching between primary and secondary paths in a packet-based network involves table entries that are pre-programmed with a primary path, a secondary path, and a value that identifies the primary path, referred to herein as a primary path identifier (PPI). When table entries are accessed to make forwarding decisions, the PPI is compared to a field that identifies that a particular path is down, referred to as a down path identifier (DPI). If the two fields match, (i.e., PPI=DPI), then the secondary path is selected instead of the primary path as the path on which the traffic should be forwarded. The protection switching scheme enables protection switching to be initiated for all table entries that identify the same primary path by simply changing the value of the DPI to identify the down path. The protection switching scheme is highly scaleable and can be easily implemented in hardware.

Other aspects and advantages of the present invention will become apparent from the following detailed description, taken in conjunction with the accompanying drawings, illustrating by way of example the principles of the invention.

DETAILED DESCRIPTION

Protection switching between primary and secondary paths in a packet-based network involves table entries that are pre-programmed with a primary path, a secondary path, and a value that identifies the primary path, referred to herein as a primary path identifier (PPI). When table entries are accessed to make forwarding decisions, the PPI is compared to a field that identifies that a particular path is down, referred to as a down path identifier (DPI). If the two fields match, (i.e., PPI=DPI), then the secondary path is selected instead of the primary path as the path on which the traffic should be forwarded.

Figure 2:
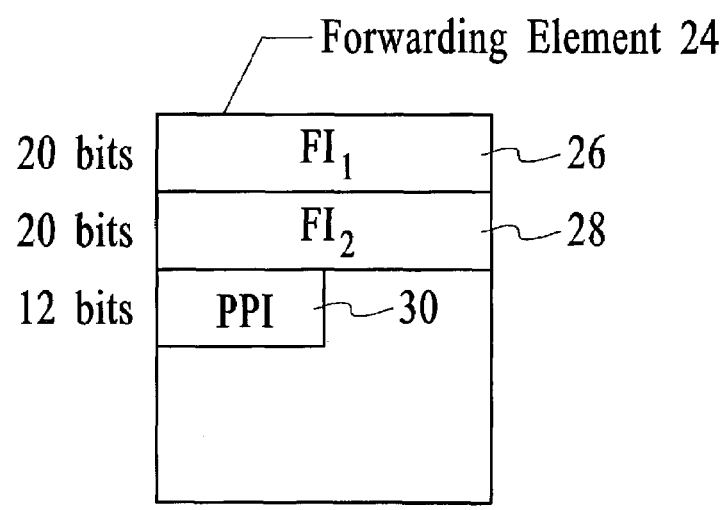
FIG. 2 depicts an embodiment of a forwarding element that includes two different forwarding information (FI) fields and a primary path identifier (PPI) field in accordance with an embodiment of the invention.

FIG. 2 depicts an embodiment of a forwarding element 24 that includes two different forwarding information (FI) fields 26 and 28 and a primary path identifier (PPI) field 30. In the example embodiment of FIG. 2, the FIs are 20-bit fields that include forwarding information. The forwarding information indicates the path on which a related packet should be forwarded. The FIs may include direct forwarding information or a pointer to forwarding information that is stored in another location. The forwarding information may include, a source IP address, a destination IP address, a source media access control (MAC) address, a destination MAC address, a virtual private network (VPN) ID, a virtual circuit (VC) ID, a label switch path (LSP) ID, a virtual local area network (VLAN) ID, an output port, QoS information, tunneling information, statistics or any combination thereof. Of the two different FIs, one FI identifies a primary path and the other FI identifies a secondary path on which a related packet should be forwarded. In the example forwarding element, the primary FI is represented by $FI_1$ and the secondary FI is represented by $FI_2$, although this is implementation specific. In an embodiment, both the primary and secondary FIs may be written to the lookup table at the time of initiation or as soon as the paths are learned. That is, forwarding information is pre-programmed into the FIs so that the forwarding information in both FIs is available upon an access of the forwarding element. Examples of techniques that can be used to establish the primary and secondary paths include open path first route discovery and constraint-based path selection based on a traffic engineering database. Paths can be established online (i.e., by the nodes themselves) or offline (i.e., by control systems not actually responsible for forwarding data).

The PPI field 30 stores a PPI that identifies the path that has been designated as the primary path for packets related to the forwarding element. In the example of FIG. 2, the PPI is a 12-bit field although this is implementation specific. The PPI may identify a path directly or indirectly. For example, the PPI may identify a path in terms of a port number by identifying the actual port number from which a packet should be forwarded (i.e., port 4 may be represented by PPI=4) or the PPI may be a translated value that indirectly identifies the path on which a packet should be forwarded (i.e., a 32-bit next hop IP address may be represented by a unique 12-bit PPI value). In an embodiment, the PPI is written to the lookup table along with the primary and secondary FIs. The PPI is pre-programmed into the forwarding element so that it is available upon an access of the FE.

The primary FI and the PPI are related to each other in that they both correspond to the primary path. That is, the primary FI, $FI_1$, corresponds to the primary path because the primary FI either directly identifies the primary path or is used to identify the primary path and the PPI corresponds to the primary path because it either directly or indirectly identifies the primary path. In contrast, the secondary FI, $FI_2$, identifies a path that is different from the path identified by $FI_1$ and the PPI.

Throughout the description, the term "path" is used broadly to identify any means by which a packet is forwarded to a next destination. For example, a path may be identified by a physical path identifier, a logical path identifier, or a combination thereof. Example path identifiers include a next hop IP address, a MAC address, a VPN ID, a VC ID, an LSP, a VLAN ID, an output port, QoS information, tunneling information, statistics, or any combination thereof.

In an embodiment, the forwarding element 24 of FIG. 2 is stored in a lookup table as one of many different forwarding elements. The forwarding elements are accessed by a lookup engine in the processes of determining how to forward traffic. For example, a forwarding element may be accessed for each incoming packet based on the packet's header information. There may be a different forwarding element for each different type of traffic, where the type of traffic is defined by information in the packet headers. For example, there may be different forwarding elements for packets that have identical characteristics except for a different source IP address. The forwarding elements are also referred to as table entries. Establishing table entries for different traffic characteristics is well-known in the art of packet-based networking and is not described further.

The protection switching technique described herein involves comparing a PPI to a down path identifier (DPI). A DPI is a value that identifies that a particular path is down.

Throughout the description, the terms "down" or "path down" are used broadly to identify a path that is not to be used to forward packets. A down path may be down for many different reasons. For example, a path may be designated as down because it is physically inoperable (i.e., because of a cut fiber or a transceiver failure). A path may be designated as down because the transmission quality has degraded (i.e., the BER is too high). A virtual path may be designated as down if the traffic loading on the physical link is too high. In addition, a path may be designated as down if the path is purposely taken out of service (i.e., for repair or maintenance) or because one of the nodes in the path has stopped responding oven though the physical connection is still available. A path can be determined to be down in different ways. For example, physical-based discovery techniques and/or protocol-based discovery techniques can be utilized to identify a down path. Example physical-based discovery techniques include loss of signals between two nodes or increased bit error rates and example protocol-based discovery techniques include the absence of messages indicating that the path is available. In an embodiment, the DPI has the same size bit field as the PPI.

Figure 3A:
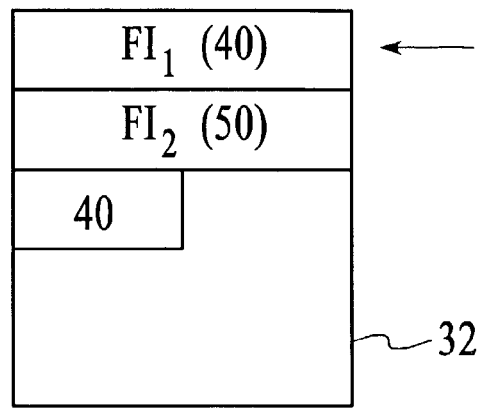
FIG. 3A depicts an example forwarding element, in accordance with an embodiment of the invention, for packets that are traveling from source node A to destination node C in the network of FIG. 1.

An embodiment of a technique for providing protection switching between primary and secondary paths is described below with reference to FIGS. 3A-11. FIG. 3A depicts an example forwarding element 32 for packets that are traveling from source node A 10 to destination node C 12 in the network of FIG. 1. The forwarding element in the example of FIG. 3A is located at router $R_1$ 16 and the forwarding decision is described from the perspective of a packet that needs to be forwarded from router $R_1$ to reach destination node C. As described above, the forwarding element includes a primary FI, $FI_1$, and a secondary FI, $FI_2$, and a PPI. In the example of FIG. 3A, the primary FI, $FI_1$, identifies path 40, the secondary FI, $FI_2$, identifies path 50, and the PPI identifies path 40. In the example of FIG. 3A, both of the possible paths, 40 and 50, are available and therefore, the DPI does not identify either one of the paths. For example, when both paths are available, the DPI may be zero, or null. In operation, when the forwarding element is accessed in response to a packet destined for node C, the PPI is compared to the DPI before an FI is selected from one of the two possible FIs and one of the FIs is selected in response to the comparison. In accordance with an embodiment of the invention, if the PPI does not match the DPI (i.e., PPI:40≠DPI:0), then the primary FI, $FI_1$, is selected for use in forwarding the packet and if the PPI does match the DPI (i.e., PPI:40=DPI:40), then the secondary FI, $FI_2$, is selected for use in forwarding the packet. In the example of FIG. 3A, the primary path is available and the PPI and DPI do not match. Therefore, $FI_1$ is selected as indicated in FIG. 3A. Because $FI_1$ is selected, the packet is forwarded on path 40.

Figure 1:
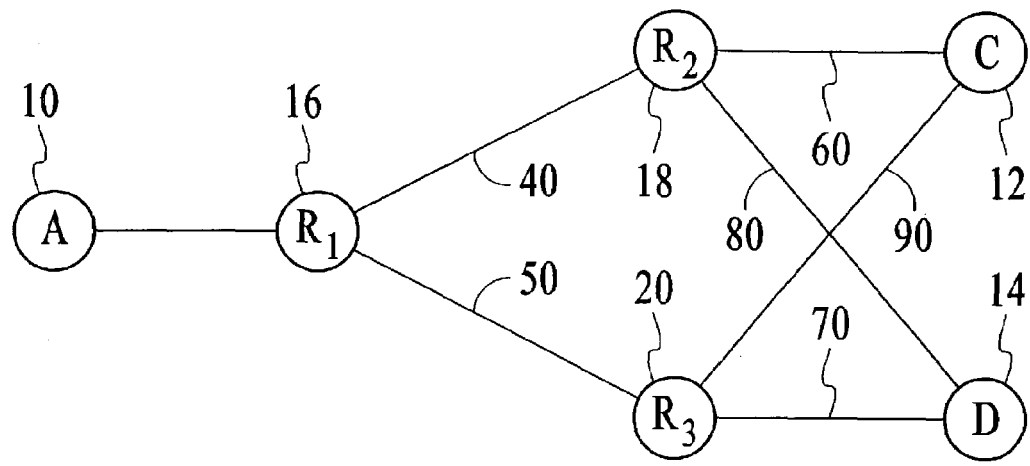
FIG. 1 depicts an example of a mesh network architecture in which there is more than one path that can be used to get packets from a source node to a destination node.
Figure 3B:
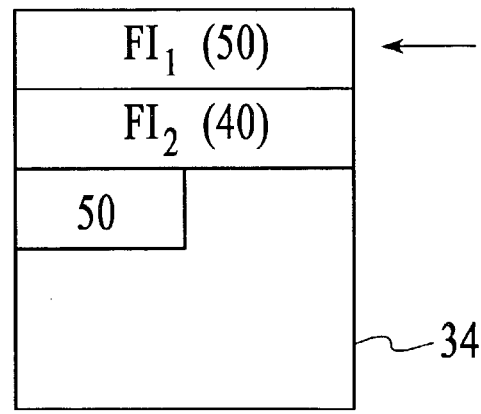
FIG. 3B depicts an example forwarding element, in accordance with an embodiment of the invention, for packets that are traveling from source node A to destination node D in the network of FIG. 1.

FIG. 3B depicts an example forwarding element 34 for packets that are traveling from source node A 10 to destination node D 14 in the network of FIG. 1. The forwarding element is located in router $R_1$ 16 and identifies path 50 as the primary path and path 40 as the secondary path. The PPI identifies path 50 (PPI=50). In operation, when the forwarding element is accessed in response to a packet destined for node D, the PPI is compared to the DPI before an FI is selected from the two possible FIs and one of the FIs is selected in response to the comparison. In the example of FIG. 3B, the primary path is available and the PPI and DPI do not match. Therefore, $FI_1$ is selected as indicated in FIG. 3B. Because $FI_1$ is selected, the packet is forwarded on path 50.

Figure 4:
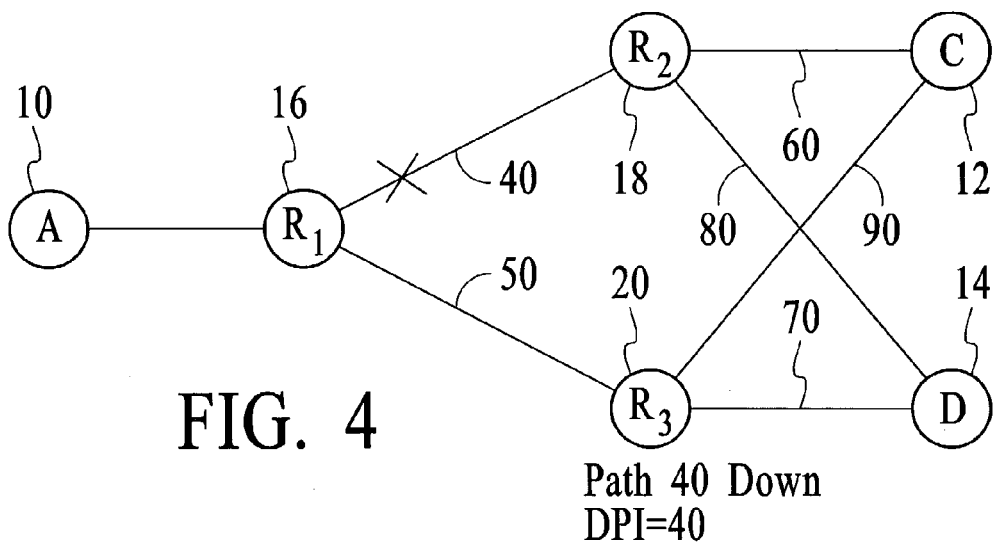
FIG. 4 depicts the example mesh network of FIG. 1, in which path 40 is down as indicated by the "X" through path 40.

As long as the above-described paths are available, the primary paths are selected and protection switching is not necessary. However, if one of the paths goes down, protection switching is implemented as described with regard to FIGS. 4-6. FIG. 4 depicts the example mesh network of FIG. 1, in which path 40 is down as indicated by the "X" through path 40. In response to identifying path 40 as being down, the DPI is changed to identify the down path. In the example of FIG. 4, the DPI is changed from DPI=0 to DPI=40 in response to identifying path 40 as being down. In operation, when subsequent forwarding elements are accessed at router $R_1$, the PPIs of the accessed forwarding elements are compared to a DPI of 40 instead of a DPI of 0.

Figure 5A:
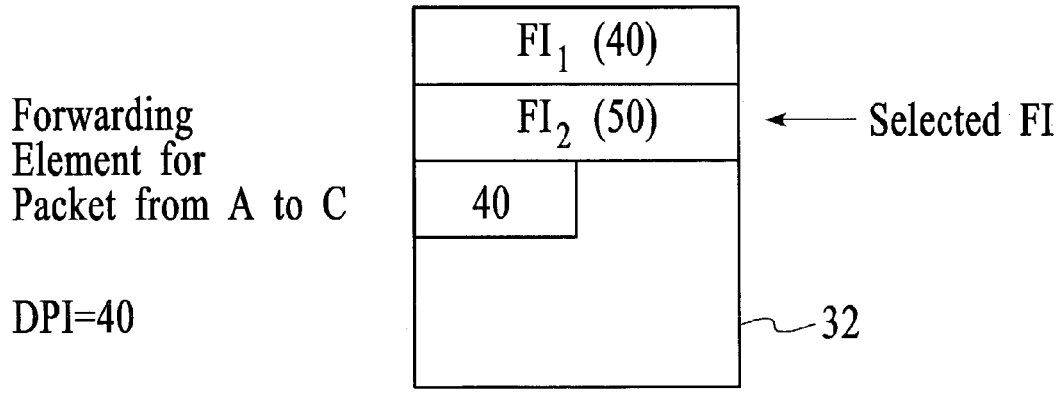
FIG. 5A depicts the same forwarding element as in corresponding FIG. 3A except that the secondary FI is selected in accordance with an embodiment of the invention.
Figure 5B:
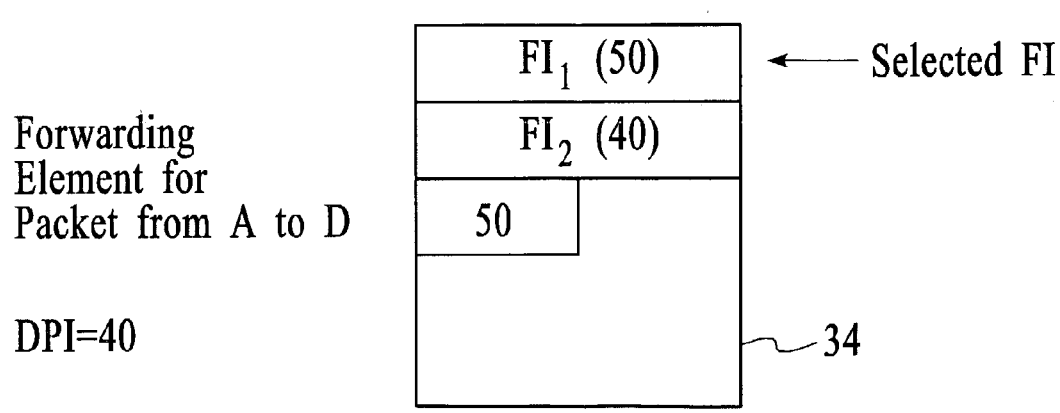
FIG. 5B depicts the same forwarding element as in corresponding FIG. 3B.

FIGS. 5A and 5B depict the same forwarding elements 32 and 34 as in corresponding FIGS. 3A and 3B. Again, the forwarding elements are located within router $R_1$ and the forwarding decisions are described from the perspective of packets that are forwarded from router $R_1$. With regard to FIG. 5A, upon accessing the forwarding element 32, the PPI is compared to the DPI. Because the PPI matches the DPI (i.e., PPI:40=DPI:40), the secondary FI, $FI_2$, is selected among the two possible FIs instead of the primary FI, $FI_1$. Selecting the secondary FI, $FI_2$, causes the packet to be forwarded along path 50 to router $R_3$, thus avoiding the down path. Upon reaching router $R_3$, the packet can be forwarded along path 90 to destination node C. In an embodiment, the packet is forwarded from router $R_3$ using standard forwarding techniques. As illustrated by this example, protection switching is achieved by simply comparing the PPI to the DPI and selecting one of the two FIs in response to the comparison.

With regard to FIG. 5B, upon accessing the forwarding element 34, the PPI is compared to the DPI. Because the PPI does not match the DPI (i.e., PPI:40≠DPI:50), the primary FI, $FI_1$, is selected among the two possible FIs. Selecting the primary FI, $FI_1$, causes the packet to be forwarded along path 50 to router $R_3$. Even though the DPI has changed from 0 to 40, the change does not affect the forwarding decision obtained from this forwarding element. If however, path 50 goes down instead of path 40, the PPI from the forwarding element of FIG. 5B would match the DPI and the secondary FI, $FI_2$, would be selected as described above with reference to FIG. 5A.

Figure 6:
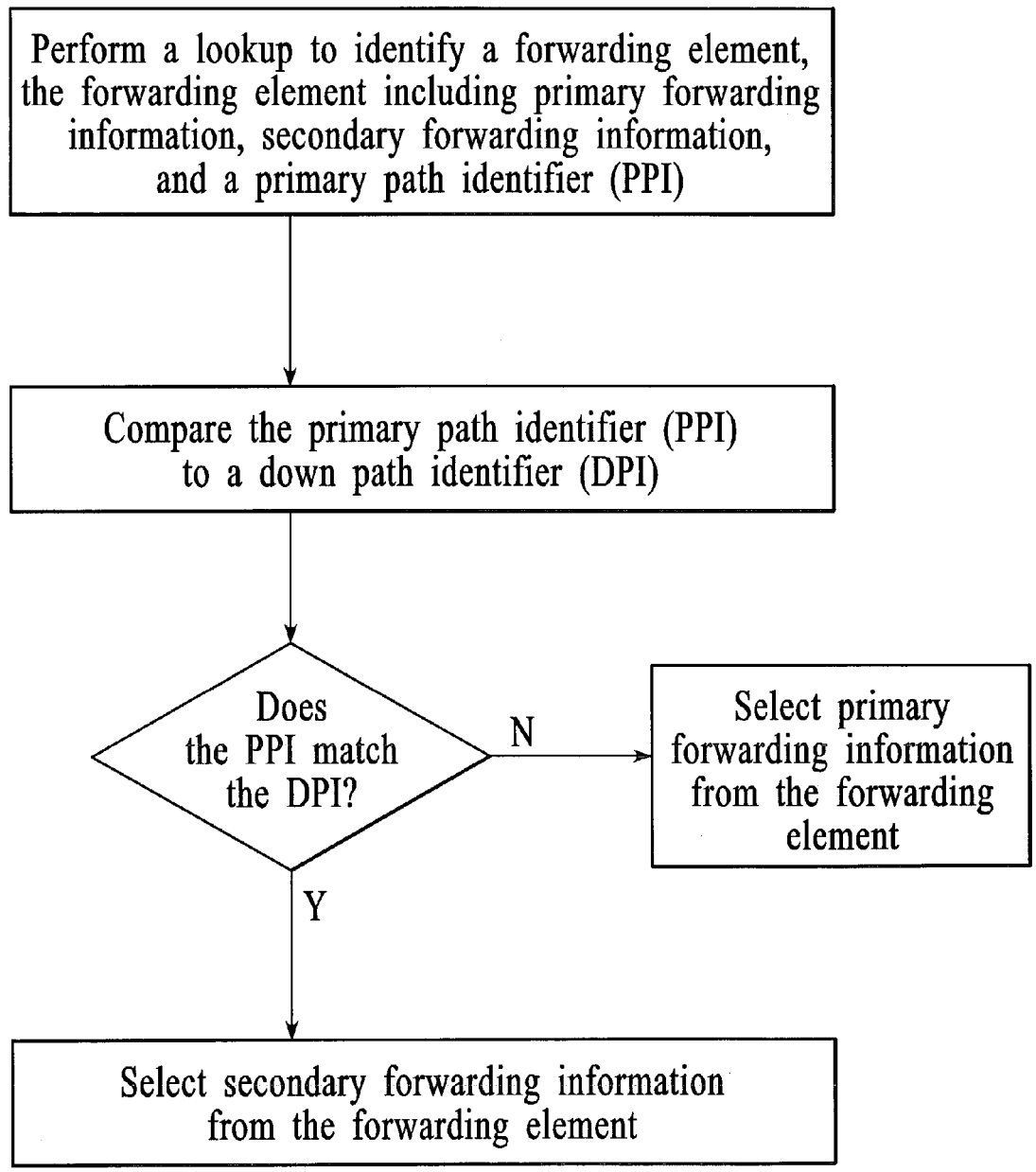
FIG. 6 depicts a process flow diagram of a method for providing protection switching between primary and secondary paths in accordance with an embodiment of the invention.
Figure 7:
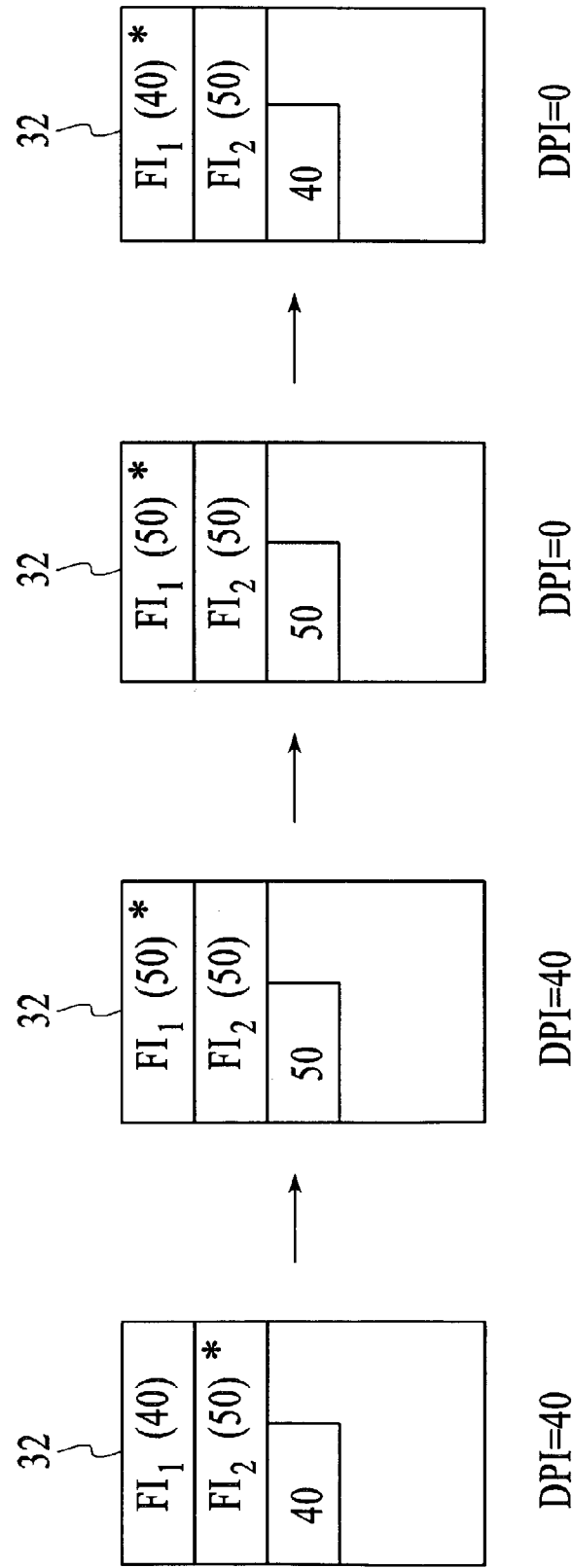
FIGS. 7A-7D depict an example of steps for re-writing the contents of a forwarding element in response to a link failure in accordance with an embodiment of the invention.

FIG. 6 depicts a process flow diagram of a method for providing protection switching between primary and secondary paths. At block 602, a lookup is performed to identify a forwarding element, with the forwarding element including primary forwarding information, secondary forwarding information, and an PPI. At block 604, the PPI is compared to a DPI. At decision point 606, it is determined whether or not the PPI matches the DPI. If the PPI does not match the DPI, then at block 608, the primary forwarding information is selected from the forwarding element. If, however, the PPI does match the DPI, then at block 610, the secondary forwarding information is selected from the forwarding element.

An advantage of the above-identified protection switching scheme is that when multiple forwarding elements have the same PPI, the selection of FIs for all of the forwarding elements with the same PPI will be effected by changing only one value, the DPI value. For example, if 10,000 forwarding elements (also referred to as table entries) have the same PPI, then all 10,000 forwarding elements will be immediately effected upon changing a single DPI value. Causing the secondary FIs to be selected across multiple table entries by changing only one value achieves protection switching without having to re-write all 10,000 table entries.

In an embodiment, the protection switching mechanism described above is used as a short term solution to prevent the loss of traffic due to a path failure. Once the protection switching has been initiated, it may be desirable to re-write the FI in the forwarding elements to reflect the change in path status. FIGS. 7A-7D depict an example of steps that may be taken to re-write the contents of a forwarding element in response to a link failure. The forwarding element 32 in FIG. 7A is the same as the forwarding element in FIG. 5A. With regard to FIG. 7A, the primary FI identifies path 40, the secondary FI identifies path 50, and the PPI identifies path 40. In addition, path 40 is down as indicated by DPI=40. Because the PPI matches the DPI, the secondary FI, $FI_2$, is selected for use in forwarding a packet. The selected FI is indicated by an asterisk '*' in FIGS. 7A-7D.

If it is determined that path 40 is going to be down for an extended period of time, it may be desirable to re-write the forwarding element 32 such that path 50 is the primary path. As depicted in FIG. 7B, the primary FI and the PPI have been re-written to identify path 50. Path 40 is still down and the DPI remains 40. However, because the PPI no longer matches the DPI, the primary FI is selected, as indicated by the *. Because the primary forwarding information has been re-written to identify path 50, path 50 is still used to forward packets instead of the down path 40.

After some time has passed, the down path may return to an available status. FIG. 7C indicates that the DPI has changed to reflect that path 40 is no longer down. In particular, the DPI has changed from DPI=40 to DPI=0 while the forwarding element 32 is unchanged. Because a comparison between the PPI and the DPI does not result in a match (i.e., PPI:50≠DPI:0), the primary FI is selected, as indicated by the * and a packet is forwarded on path 50.

Once path 40 is available, it may be desirable to change path 40 back to the primary path for the forwarding element 32. To change the primary path, FI, and the PPI can be re-written to identify path 40. FIG. 7D reflects that the primary FI, $FI_1$, and the PPI have been re-written to identify path 40. Subsequent accesses to the forwarding element will result in the primary FI being selected as long as the PPI and DPI do not match. The rewriting of the forwarding elements can be done in software using techniques that are known in the field without losing traffic. Traffic is not lost because the protection switching scheme ensures traffic is forwarded onto the secondary path until the forwarding elements can be re-written to identify the desired path as the primary path.

Figure 8:
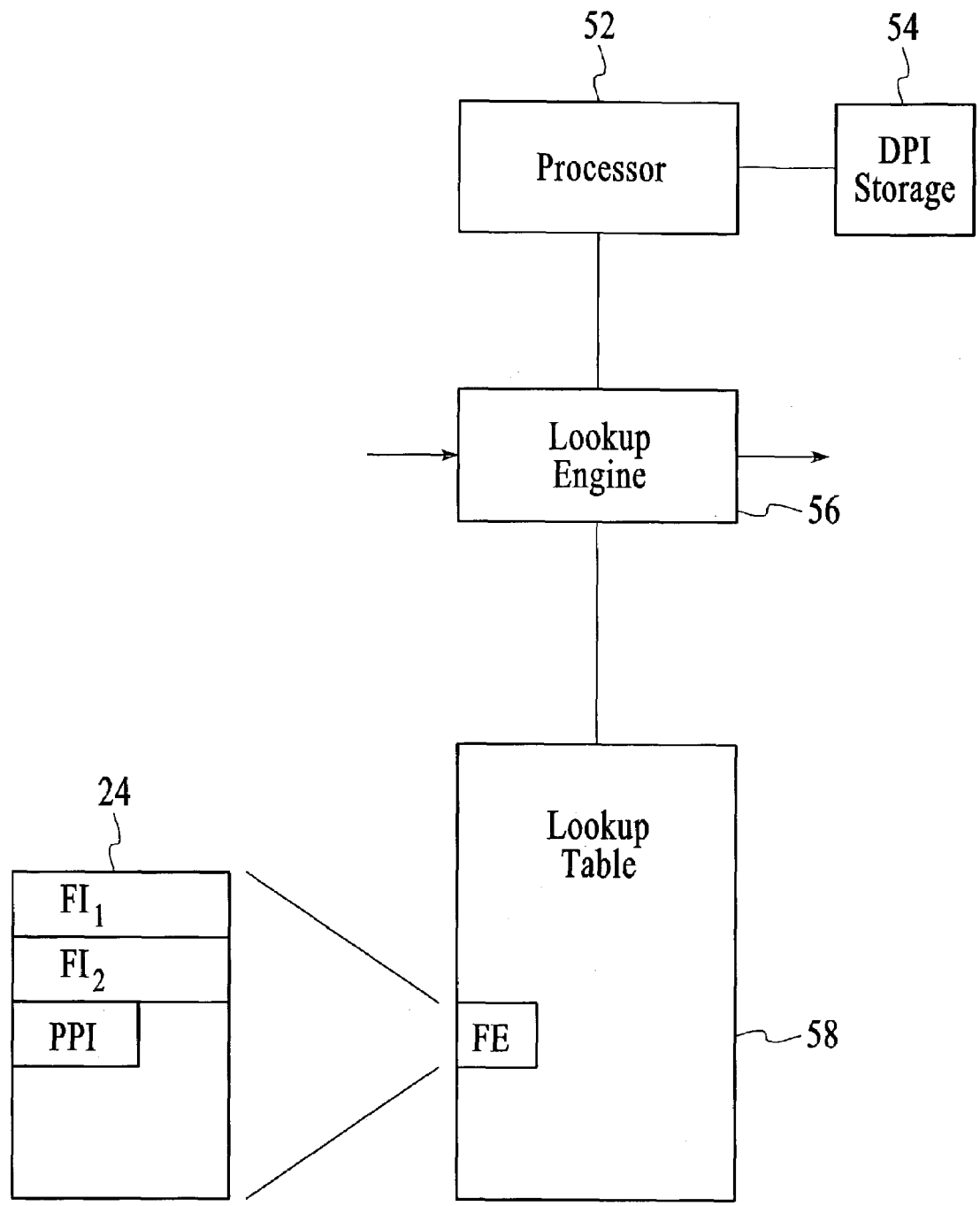
FIG. 8 depicts an example embodiment of a system for providing protection switching between primary and secondary paths in accordance with an embodiment of the invention.

FIG. 8 depicts an example embodiment of a system for providing protection switching between primary and secondary paths as described above with regard to FIGS. 2-7. The system includes a processor 52, DPI storage 54, a lookup engine 56, and a lookup table 58. In the embodiment of FIG. 8, the lookup table is stored in memory such as random access memory (RAM) or content addressable memory (CAM). The lookup table includes forwarding element fields for storing forwarding elements. As depicted by the expanded view of a forwarding element 24, the forwarding element fields include a primary FI field, $FI_1$, for storing primary forwarding information, a secondary FI field, $FI_2$, for storing secondary forwarding information and a PPI field for storing a PPI. The DPI storage is a memory unit that includes a DPI field for storing a DPI. The DPI storage is connected to the processor and the lookup engine such that the DPI can be accessed by either the lookup engine or the processor. The lookup engine performs forwarding decision lookups. In the embodiment of FIG. 8, the lookup engine performs forwarding decision lookups based on header information obtained from incoming packets. The lookup engine may be embodied in an ASIC. In addition to other functions, which are beyond the scope of this disclosure, the processor manages the DPI. Management functions related to the DPI may include changing the DPI when the status of a path has changed and translating DPI values when paths are not directly identified by DPI values. Although in this embodiment, the DPI is managed by the processor, the DPI could be managed by other logic such as application specific logic that is embedded into an ASIC.

Figure 9:
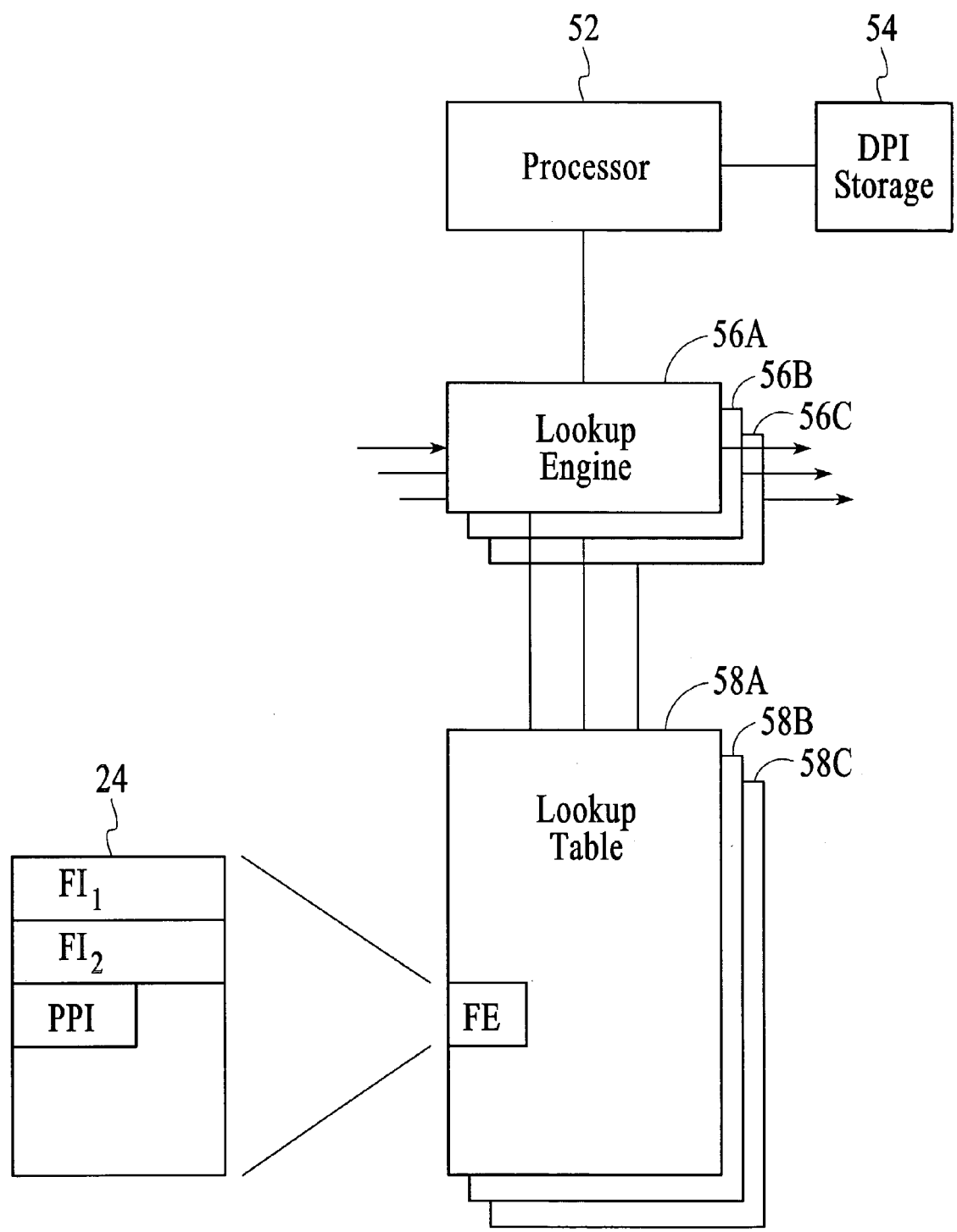
FIG. 9 depicts an example embodiment of a system that includes multiple lookup tables and lookup engines that can simultaneously utilize the same mechanism to achieve protection switching between primary and secondary paths in accordance with an embodiment of the invention.

Although the system for providing protection switching is described above in terms of a single lookup table and a single lookup engine, an attractive feature of the system is that it can be easily scaled to provide fast protection switching for a large number of forwarding elements and a large number of paths. FIG. 9 depicts an example embodiment of a system that includes multiple lookup tables 58A, 58B, and 58C and lookup engines 56A, 56B, and 56C that can simultaneously utilize the same mechanism to achieve protection switching between primary and secondary paths. In the example embodiment of FIG. 9, the same DPI can be simultaneously compared to multiple PPIs that are accessed by multiple different lookup engines. For example, in a card-based switch or router, the different lookup engines and lookup tables may be related to different ports on the same card and/or the different lookup engines and lookup tables may be related to different cards in the same switch or router. Although different lookup engines and lookup tables are distributed throughout a card or system, a single DPI is used for comparisons by all of the lookup engines. Changing the DPI value causes card-wide or system-wide protection switching for all forwarding elements having a PPI that matches the DPI. In a distributed environment such as FIG. 9, the DPI may be stored in a central DPI storage and then distributed to local DPI storage such that card-wide or system-wide protection switching can be initiated by changing one central DPI value and then distributing the DPI value to the local DPI storage.

Figures 10, 11:
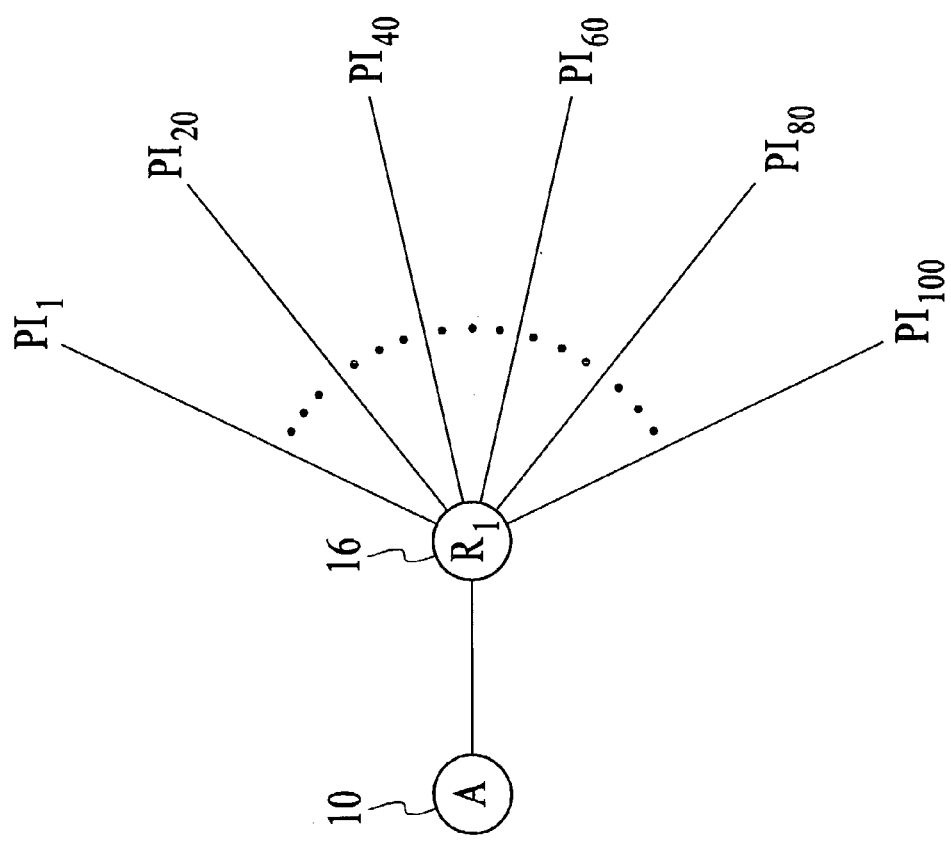
FIG. 10 depicts an example of a router that has multiple possible paths, for example, 100 possible paths identified by path identifiers (PIs), $PI_1$-$PI_{100}$.
FIG. 11 depicts an example of the status of five different down path identifiers (DPIs) at four different times.

In an embodiment that includes multiple possible paths, it may be necessary to be able to simultaneously identify more than one path as being down. In an embodiment, this is achieved by establishing multiple DPI fields that are compared with the PPI each time a forwarding element is accessed. FIG. 10 depicts an example of a router 10 that has multiple possible paths for forwarding traffic from a source node 10. For example, router $R_1$ has 100 possible paths identified by path identifiers (PIs), $PI_1$-$PI_{100}$. These paths may be physical paths, virtual paths, or a combination thereof. Because it is possible that more than one path may be down at any one time, in an embodiment, multiple DPI fields are established. For example, five DPI fields, $DPI_1$-$DPI_5$, are stored in five registers. The five registers can then be used simultaneously and independently to identify up to five different down paths. FIG. 11 depicts an example of the status of five different DPIs at four different times. At time 1, there are no down paths and therefore all of the DPIs are 0. At time 2, two paths have simultaneously gone down (i.e., paths 35 and 76) and in response, two DPIs have been changed to reflect the change in status. In particular, $DPI_1$ has been changed to 35 and $DPI_2$ has been changed to 76 to reflect the down paths. Upon accessing forwarding elements, any forwarding elements having matching PPIs will be switched to the corresponding secondary path. The DPI values remain the same until the status of the respective paths has changed. At time 3, the status of the paths are the same and therefore the DPI values are all the same. At time 4, the status of two paths has changed. In particular, path 35 has changed from down to available, as indicated by $DPI_1$=0 and path 46 has changed from available to down as indicated by $DPI_3=46$. Again, upon accessing forwarding elements, any forwarding elements having matching PPIs will be switched to the corresponding secondary path.

The number of DPI fields is implementation specific. Because each DPI must be compared to the PPI of an accessed FI, the more DPIs there are, the more resources that are required to complete the comparisons. If the comparisons are done in series, then each additional comparison requires more time. If the multiple comparisons are performed in parallel, then parallel hardware resources are required.

The protection switching scheme is described as being implemented in a packet-based network. Packet-based network is defined herein to include any network that transmits data in discrete packets, where the packets could be variable-length packets such as Ethernet packets and/or IP packets or fixed-length packets such as 53-byte ATM cells.

Although the forwarding elements are described as including only one secondary FI, the forwarding elements could include multiple secondary FIs. The secondary FIs could be selected, for example, by using multiple PPI fields.

Although FIGS. 1 and 4 identify different paths between the routers and destination nodes, the paths could run between multiple network nodes. For example, a single path, such as an LSP, could run from $R_1$ to $R_3$ to destination node C.

The above-described technique could be applied to a multipath application in which traffic intended for the same destination is distributed over multiple paths. Multipath applications are often used to achieve load balancing. If one of the paths fails, then protection switching scheme can be used to quickly recover from the path failure by diverting traffic onto one of the other paths.

Although specific embodiments of the invention have been described and illustrated, the invention is not to be limited to the specific forms or arrangements of parts as described and illustrated herein. The invention is limited only by the claims.

What is claimed is:

1. A method for providing protection switching between primary and secondary paths in a packet-based network comprising:
   performing a lookup to identify a forwarding element, the forwarding element including primary forwarding information, secondary forwarding information, and a primary path identifier (PPI);
   comparing said PPI to a down path identifier (DPI);
   selecting said primary forwarding information from said forwarding element if said PPI does not match said DPI; and
   selecting said secondary forwarding information from said forwarding element if said PPI matches said DPI.

2. The method of claim 1 further including using either said selected primary forwarding information or selected secondary forwarding information to forward a packet.

3. The method of claim 1 further including changing the value of said DPI to a value that represents that a particular path is down upon determining that said particular path is down.

4. The method of claim 3 wherein changing the value of said DPI includes writing said value into a hardware-based register.

5. The method of claim 4 wherein said lookup is performed in a hardware-based lookup table.

6. The method of claim 5 wherein said comparison involves comparing said hardware-based register that stores said DPI to a hardware-based register that stores said PPI.

7. The method of claim 1 wherein said PPI represents one of an IP next hop address, a media access control (MAC) address, a virtual private network (VPN) ID, a virtual circuit (VC) ID, a virtual local area network (VLAN) ID, a label switch path (LSP) ID, or an output port.

8. The method of claim 1 wherein said secondary forwarding information is selected as long as said PPI and said DPI match.

9. The method of claim 1 wherein comparing said PPI to said DPI includes comparing said PPI to multiple DPIs and wherein selecting either said primary forwarding information or said secondary information in response to said comparing includes selecting said secondary forwarding information if said PPI matches any of said multiple DPIs.

10. The method of claim 1 wherein comparing said PPI to said DPI involves comparing two hardware-based registers.

11. The method of claim 1 further including storing said DPI, at a central location within said network node and distributing said DPI to multiple lookup engines.

12. The method of claim 1 further including pre-programming said forwarding element with said primary forwarding information, said secondary forwarding information, and said PPI.

13. A system for providing protection switching between primary and secondary paths in a packet-based network comprising:
   first memory for storing a lookup table, said lookup table having forwarding element fields for storing forwarding elements, said forwarding element fields including a primary forwarding information field for storing primary forwarding information, a secondary forwarding information field for storing secondary forwarding information, and a primary path identifier (PPI) field for storing a PPI;
   second memory having a down path identifier (DPI) field for storing a DPI; and
   a lookup engine configured for: performing a lookup to identify a first forwarding element;
   comparing the PPI from said first forwarding element to said DPI;
   selecting said primary forwarding information from said forwarding element if said PPI does not match said DPI; and
   selecting said secondary forwarding information from said forwarding element if said PPI matches said DPI.

14. The system of claim 13 further including means for changing said DPI that is stored in said second memory in response to a change in status of a path.

15. The system of claim 13 wherein said lookup table is a hardware-based lookup table.

16. The system of claim 13 wherein comparing the PPI from said first forwarding element to said DPI includes comparing two hardware-based registers.

17. The system of claim 13 wherein said second memory includes multiple DPI fields for storing multiple DPIs.

18. The system of claim 13 further including:
   multiple lookup tables;
   multiple lookup engines;
   local DPI storage associated with each one of said multiple lookup engines; and
   means for distributing said DPI from second memory to said local DPI storage that is associated with each one of said multiple lookup engines.

19. A method for providing protection switching between primary and secondary paths in a packet-based network comprising:
   writing primary forwarding information, secondary forwarding information, and a primary path identifier (PPI) into a forwarding element of a lookup table;
   identifying said forwarding element in said lookup table;
   comparing said PPI to a down path identifier (DP1);
   selecting said primary forwarding information from said forwarding element if said PPI does not match said DPI; and
   selecting said secondary forwarding information from said forwarding element if said PPI matches said DPI.

20. The method of claim 19 further including using either said selected primary forwarding information or selected secondary forwarding information to forward a packet.

21. The method of claim 19 further including changing the value of said DPI to a value that represents that a particular path is down upon determining that said particular path is down.

22. The method of claim 19 wherein said comparison involves comparing a hardware-based register that stores said DPI to a hardware-based register that stores said PPI.

23. The method of claim 19 wherein said secondary forwarding information is selected as long as said PPI and said DPI match.

24. The method of claim 19 wherein comparing said PPI to said DPI includes comparing said PPI to multiple DPIs and wherein selecting either said primary forwarding information or said secondary information in response to said comparing includes selecting said secondary forwarding information if said PPI matches any of said multiple DPIs.

25. The method of claim 19 further including storing said DPI at a central location within said network node and distributing said DPI to multiple lookup engines.

* * * * *